US007599965B1

(12) United States Patent
Benitez et al.

(10) Patent No.: US 7,599,965 B1
(45) Date of Patent: *Oct. 6, 2009

(54) MULTIMEDIA INTEGRATION DESCRIPTION SCHEME, METHOD AND SYSTEM FOR MPEG-7

(75) Inventors: Ana Benitez, New York, NY (US);
Shih-Fu Chang, New York, NY (US);
Qian Huang, Ocean, NJ (US);
Seungyup Paek, New York, NY (US);
Atul Puri, Riverdale, NY (US)

(73) Assignees: AT&T Intellectual Property II, L.P., New York, NY (US); Columbia University in the City of New York, New York, NY (US)

( * ) Notice: Subject to any disclaimer, the term of this patent is extended or adjusted under 35 U.S.C. 154(b) by 266 days.

This patent is subject to a terminal disclaimer.

(21) Appl. No.: 11/616,315

(22) Filed: Dec. 27, 2006

Related U.S. Application Data

(63) Continuation of application No. 09/495,175, filed on Feb. 1, 2000, now Pat. No. 7,185,049.

(60) Provisional application No. 60/118,022, filed on Feb. 1, 1999.

(51) Int. Cl.
*G06F 17/30* (2006.01)
(52) U.S. Cl. .................................................. 707/104.1
(58) Field of Classification Search ...................... 707/1, 707/7, 10, 100–102, 104.1, 200; 709/227; 715/716; 370/395.64; 380/217; 704/239; 725/90

See application file for complete search history.

(56) References Cited

U.S. PATENT DOCUMENTS 5,146,591 A 9/1992 Bachman et al.

(Continued)

FOREIGN PATENT DOCUMENTS

WO WO 00/28467 5/2000

OTHER PUBLICATIONS

International Organization of Standardization, Organization International Normalization, ISO/IEC JTC1/SC29/WG11, Coding of Moving Picture and Associated Audio, MPEG 98 (MPEG-7 Evaluation Process Document), Atlantic City, Oct. 1998 p. 1-75.

(Continued)

*Primary Examiner*—Diane Mizrahi

(57) ABSTRACT

The invention provides a system and method for integrating multimedia descriptions in a way that allows humans, software components or devices to easily identify, represent, manage, retrieve, and categorize the multimedia content. In this manner, a user who may be interested in locating a specific piece of multimedia content from a database, Internet, or broadcast media, for example, may search for and find the multimedia content. In this regard, the invention provides a system and method that receives multimedia content and separates the multimedia content into separate components which are assigned to multimedia categories, such as image, video, audio, synthetic and text. Within each of the multimedia categories, the multimedia content is classified and descriptions of the multimedia content are generated. The descriptions are then formatted, integrated, using a multimedia integration description scheme, and the multimedia integration description is generated for the multimedia content. The multimedia description is then stored into a database. As a result, a user may query a search engine which then retrieves the multimedia content from the database whose integration description matches the query criteria specified by the user. The search engine can then provide the user a useful search result based on the multimedia integration description.

24 Claims, 5 Drawing Sheets

U.S. PATENT DOCUMENTS

| | | | |
|---|---|---|---|
| 5,999,944 | A | 12/1999 | Lipkin |
| 6,418,448 | B1 | 7/2002 | Sarkar |
| 6,452,609 | B1 | 9/2002 | Katinsky et al. |
| 6,847,980 | B1 | 1/2005 | Benitez et al. |
| 6,941,325 | B1 | 9/2005 | Benitez et al. |
| 7,185,049 | B1 * | 2/2007 | Benitez et al. ............. 709/203 |
| 7,225,249 | B1 | 5/2007 | Barry et al. |
| 7,254,285 | B1 * | 8/2007 | Paek et al. .................. 382/305 |
| 7,290,061 | B2 * | 10/2007 | Lentini et al. ............... 709/246 |
| 2006/0167876 | A1 * | 7/2006 | Benitez et al. ................. 707/7 |
| 2007/0245400 | A1 * | 10/2007 | Paek et al. .................. 725/142 |

OTHER PUBLICATIONS

A Formal Semantics for UML Interactions, Knapp, A., Springer-Verlag Berlin, 1999, pp. 116-130.

The Virtual Reality Modeling Language and Java, Brutzman, D., Comm. of the ACM, Jun. 1998, vol. 41, No. 6, p. 57-64.

Functional Modeling using Object Collaboration Diagram, IBM Technical Disclosure Bulletin, vol. 37, No. 07, Jul. 1994, p. 481-485.

MPEG-7: A Standard for describing Audiovisual information, Pereira, F., The Inst of Elect., 1998, p. 1-5.

Everything You Wanted to Know about MPEG-7: Part 2, Nack, F., Lindsay, A., IEEE Multimedia, Oct.-Dec. 1999, p. 64-73.

Chung-Sheng Li et al., "Multimedia Content Description in the InfoPyramid", Acoustics, Speech & Signal Processing, IEEE Conference, May 12-15, 1998, ACM ISBN: 0-7803-4428-6, pp. 3789-3792.

A. Puri et al., "MPEG-4: An object-based multimedia coding standard supporting mobile applications", Mobile Networks & Applications, vol. 3, Issue 1, ISSN: 1383-469X, Jun. 1998, pp. 5-32.

MPEG-7 Description Scheme for Visual Objects, Ohm, Jens-Rainer et al., 1999, pp. 153-156.

Data characterization for automatically visualizing heterogeneous information, M.X. Zhou et al., Information Visualization '96, Proceeding IEEE Symposium in Oct. 28≠29, 1996, pp. 13-20 and 117.

Multimedia Description Framework (MDF) for Content Description of Audio/Video Documents, M.J. Hu et al., International Conference on Digital Libaries, Proceedings of the 4$^{th}$ ACM Conference on Digital Libraries, Berkley, California, pp. 67-75, Feb. 6, 1999.

* cited by examiner

MULTIMEDIA INTEGRATION DESCRIPTION SCHEME, METHOD AND SYSTEM FOR MPEG-7

This application is a continuation of application Ser. No. 09/495,175, filed on Feb. 1, 2000, which claims the benefit of U.S. Provisional Application No. 60/118,022, filed Feb. 1, 1999.

This application includes an Appendix containing computer code that performs content description in accordance with the exemplary embodiment of the present invention. That Appendix of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright rights whatsoever.

BACKGROUND OF THE INVENTION

1. Field of Invention

The present invention generally relates to audiovisual data representation. More particularly, this invention relates to integrating the descriptions of multiple categories of audiovisual content to allow such content to be searched or browsed with ease in digital libraries, Internet web sites and broadcast media, for example.

2. Description of Related Art

More and more audiovisual information is becoming available from many sources around the world. Such information may be represented by various forms of media, such as still pictures, video, graphics, 3D models, audio and speech. In general, audiovisual information plays an important role in our society, be it recorded in such media as film or magnetic tape or originating, in real time, from some audio or visual sensors, be it analogue or, increasingly, digital.

While audio and visual information used to be consumed directly by the human being, computational systems are increasingly creating, exchanging, retrieving and re-processing this audiovisual information. Such is the case for image understanding, e.g., surveillance, intelligent vision, smart cameras, etc., media conversion, e.g., speech to text, picture to speech, speech to picture, etc., information retrieval, e.g., quickly and efficiently searching for various types of multimedia documents of interest to the user, and filtering to receive only those multimedia data items which satisfy the user's preferences in a stream of audiovisual content.

For example, a code in a television program triggers a suitably programmed VCR to record that program, or an image sensor triggers an alarm when a certain visual event happens. Automatic transcoding may be performed based on a string of characters or audible information or a search may be performed in a stream of audio or video data. In all these examples, the audiovisual information has been suitably "encoded" to enable a device or a computer code to take some action.

In the infancy of web-based information communication and access systems, information is routinely transferred, searched, retrieved and processed. Presently, much of the information is predominantly represented in text form. This text-based information is accessed using text-based search algorithms.

However, as web-based systems and multimedia technology continue to improve, more and more information is becoming available in a form other than text, for instance as images, graphics, speech, animation, video, audio and movies. As the volume of such information is increasing at a rapid rate it is becoming important to be easily to be able to search and retrieve a specific piece of information of interest. It is often difficult to search for such information by text-only search. Thus the increased presence of multimedia information and the need to be able to find the required portions of it in an easy and reliable manner, irrespective of the search engines employed, has spurred on the drive for a standard for accessing such information.

The Moving Pictures Expert Group (MPEG) is a working group under the International Standards Organization/International Electrotechnical Commission in charge of the development of international standards for compression, decompression, processing and coded representation of video data, audio data and their combination. MPEG previously developed the MPEG-1, MPEG-2 and MPEG-4 standards, and is presently developing the MPEG-7 standard, formally called "Multimedia Content Description Interface", hereby incorporated by reference in its entirety.

MPEG-7 will be a content representation standard for multimedia information search and will include techniques for describing individual media content and their combination. Thus, MPEG-7 standard is aiming to providing a set of standardized tools to describe multimedia content. Therefore, the MPEG-7 standard, unlike the MPEG-1, MPEG-2 or MPEG-4 standards, is not a media content coding or compression standard but rather a standard for representation of descriptions of media content. The data representing descriptions is called "meta data". Thus, irrespective of how the media content is represented, i.e., analogue, PCM, MPEG-1, MPEG-2, MPEG-4, Quicktime, Windows Media etc, the meta data associated with this content, may in future, be MPEG-7.

Often, the value of multimedia information depends on how easily it can be found, retrieved, accessed, filtered and managed. In spite of the fact that users have increasing access to this audiovisual information, searching, identifying and managing it efficiently is becoming more difficult because of the sheer volume of the information. Moreover, the question of identifying and managing multimedia content is not just restricted to database retrieval applications such as digital libraries, but extends to areas such as broadcast channel selection, multimedia editing and multimedia directory services.

Although techniques for tagging audiovisual information allow some limited access and processing based on text-based search engines, the amount of information that may be included in such tags is somewhat limited. For example, for movie videos, the tag may reflect name of the movie or list of actors etc., but this information may apply to the entire movie and may not be sub-divided to indicate the content of individual shots and objects in such shots. Moreover, the amount of information that may be included in such tags and architecture for searching and processing that information is severely limited.

SUMMARY OF THE INVENTION

The invention provides a system and method for integrating multimedia descriptions in a way that allows humans, software components or devices to easily identify, manage, manipulate, and categorize the multimedia content. In this manner, a user who may be interested in locating a specific piece of multimedia content from a database, Internet, or broadcast media, for example, may search for and find the of the multimedia content. A device or system as disclosed herein includes a processor that operates as instructed or controlled by software stored on a tangible computer-readable medium.

In this regard, the invention provides a system and method that receives multimedia content from a multimedia stream and separates the multimedia content into separate components which are assigned to single media categories, such as image, video, audio, synthetic audiovisual, and text. Within each of the single media categories, media events are classified and descriptions of such single media events are generated. These descriptions are then integrated and formatted, according to a multimedia integration description scheme. Multimedia integration description is then generated for the multimedia content. The multimedia description is then stored into a database.

As a result, a user may query a search engine which then retrieves the multimedia integration description from the database. The search engine can then provide the user a useful search result whose multimedia integration description meets the query requirements.

The exemplary embodiment of the invention addresses the draft requirements of MPEG-7 promulgated by MPEG at the time of the filing of this patent application. That is, the invention provides object-oriented, generic abstraction and uses objects and events as fundamental entities for description. Thus, the invention provides an efficient framework for description of various types of multimedia data.

The invention is also a comprehensive tool for describing multimedia data because it uses eXtensible Markup Language (XML), which is self describing. The present invention also provides flexibility because parts can be instantiated so as to provide efficient organization. The invention also provides extensibility and the ability to define relationships between data because elements defined in the description scheme can be used to derive new elements.

These and other features and advantages of this invention are described in or are apparent from the following detailed description of the system and method according to this invention.

BRIEF DESCRIPTION OF THE DRAWINGS

The preferred embodiments of the invention will be described in detail with reference to the following figures wherein.

DETAILED DESCRIPTION OF PREFERRED EMBODIMENTS

Figure 1A:
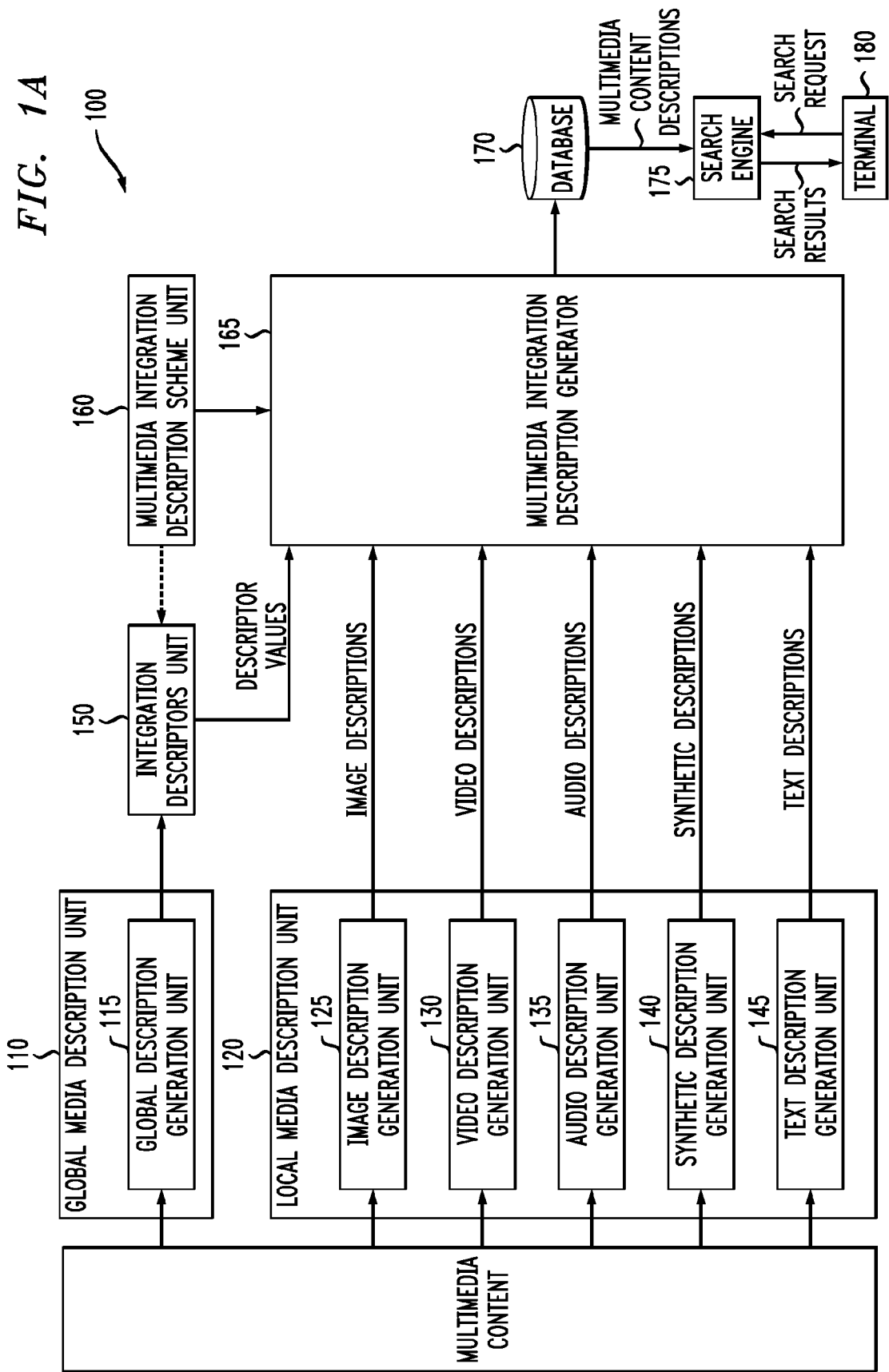
FIG. 1A is an exemplary block diagram showing a multimedia integration system.

Prior to explaining the exemplary embodiment of the invention, a synopsis of MPEG-7 is provided to aid in the reader's understanding of how the exemplary embodiment processes multimedia data within the construct of MPEG-7.

MPEG-7 is the result of a global demand that has logically followed the increasing availability of digital audiovisual content. Audiovisual information, both natural and synthetic, will continue to be increasingly available from many sources around the world. Also, users want to use this audiovisual information for various purposes. However, before the information can be used, it must be identified, located, indexed, and even characterized properly. At the same time, the increasing availability of potentially interesting material makes searching more difficult because of the increasingly voluminous pool of information to be searched.

MPEG-7 is directed at standardizing the interface for describing multimedia content to allow efficient searching and retrieval for various types of multimedia material interesting to the user. MPEG-7 is meant to provide standardization of multimedia content descriptions. MPEG-7 expects to extend the limited capabilities of proprietary solutions in identifying content that exist today, notably by including more data types. In other words, MPEG-7 will specify a standard set of descriptors that can be used to describe various types of multimedia information. MPEG-7 will also specify predefined structures of descriptors and their relationships, as well as ways to define one's own structures. These structures are called description schemes (DSs). Defining new description schemes can be performed using a special language, the description definition language (or DDL), which is also a part of the MPEG-7 standard. The description, i.e., a set of instantiated description schemes, is associated with the content itself to allow fast and efficient searching for material of a user's interest. MPEG-7 will also include coded representations of a description for efficient storage, or fast access.

Conventionally, search engines each have individual syntax formats that differ. These differences in syntax format cause compatibility issues between search criteria, e.g., identical criteria used by different engines results in different results. With the use of description schemes under MPEG-7, these search engines will be able to process MPEG-7 multimedia contents regardless of the differing syntax formats to produce the same results.

The requirements of MPEG-7 apply, in principle, to both real time and non-real time applications. Also, MPEG-7 will apply to push and pull applications. However, MPEG-7 will not standardize or evaluate applications. Rather, MPEG-7 will interact with many different applications in many different environments, which means that it will need to provide a flexible and extensible framework for describing multimedia data.

Therefore, MPEG-7 will not define a monolithic system for content description. Rather, MPEG-7 will define a set of methods and tools for describing multimedia data. Thus, MPEG-7 expects to standardize a set of descriptors, a set of description schemes, a language to specify description schemes (and possibly descriptors), e.g., the description definition language, and one or more ways to encode descriptions. A starting point for the description definition language is the XML, although it is expected that the basic XML will eventually need to be customized and modified for use in MPEG-7.

The exemplary embodiment of the invention described herein with reference to FIGS. 1A-6 conforms to the requirements of the MPEG-7 standard, in its present form.

The following description of the particular embodiment of the invention uses terminology that is consistent with definitions provided in the MPEG-7 standard. The term "data" indicates audiovisual information that is described using MPEG-7, regardless of storage, coding, display, transmission, medium or technology. Data encompasses, for example, graphics, still images, video, film, music, speech, sounds, text and any other relevant audiovisual medium. Examples of such data may be found in, for example, an MPEG-4 stream, a video tape, a compact disc containing music, sound or speech, a picture printed on paper or an interactive multimedia installation on the web.

A "feature" indicates a distinctive characteristic of the data which signifies something to someone. Examples of features include image color, speed pitch, audio segment rhythm, video camera motion, video style, movie title, actors' names in a movie, etc. Examples of features of visual objects include shape, surface, complexity motion, light, color, texture, shininess and transparency.

A "descriptor" is a representation of a feature. It is possible to have several descriptors representing a single feature. A descriptor defines the syntax and the semantics of the feature representation and allows the evaluation of the corresponding feature via the descriptor value. Examples of such descriptors include color histogram, frequency component average, motion field, title text, etc.

A "descriptor value" is an instantiation of a descriptor for a given data set. Descriptor values are combined using a description scheme to form a description.

A "description scheme", specifies the structure and semantics of relationships between its components, which may be both descriptors and description schemes. The distinction between a description scheme and a descriptor is that a descriptor contains only basic data types, as provided by the description definition language. A descriptor also does not refer to another descriptor or description scheme.

A "description" is the result of instantiating a description scheme. To instantiate a description scheme, a set of descriptor values that describe the data is structured according to a description scheme. Depending on the completeness of the set of descriptor values, the description scheme may be fully or partially instantiated. Additionally, it is possible that the description scheme may be merely incorporated by reference in the description rather than being actually present in the description. A "coded description" is a description that has been encoded to fulfill relevant requirements such as compression efficiency, error resilience, random access, etc.

The "description definition language (DDL)" is the language that allows the creation of new description schemes and, possibly, new descriptors. The description definition language also allows the extension and modification of existing description schemes.

MPEG-7 data may be physically located with the associated audiovisual material, in the same data stream or on the same storage system, but the descriptions can also be stored elsewhere. When the content and its descriptions are not co-located, mechanisms that link audiovisual material and their MPEG-7 descriptions are needed; these links must work in both directions.

The exemplary embodiment meets the present MPEG-7 requirements outlined in the present draft of MPEG-7 standard requirements. Requirements include criteria relating to descriptors, description scheme requirements, the description definition language requirements and system requirements. While the exemplary embodiment of the invention should satisfy all requirements of MPEG-7 when taken as a whole, not all requirements have to be satisfied by each individual descriptor or description scheme.

The descriptor requirements include cross-modality, direct data manipulation, data adaptation, language of text-based descriptions, linking, prioritization of related information and unique identification. Description scheme requirements include description scheme relationships, descriptor prioritization, descriptor hierarchy, descriptor scalability, temporal range description, data adaptation, compositional capabilities, unique identification, primitive data types, composite data types, multiple media types, various types of description scheme instantiations, relationships within a description scheme and between description schemes, relationship between description and data, links to ontologies, platform independence, grammar, constraint validation, intellectual property management and protection, human readability and real time support.

While a description scheme can be generated using any description definition language, the exemplary embodiment of the invention uses eXtensible Markup Language (XML) to represent the integration description scheme. XML is a useful subset of SGML. XML is easier to learn, use and implement than SGML. XML allows for self description, i.e., allows description and structure of description in the same format and document. Use of XML also allows linking of collections of data by importing external document type definitions using description schemes.

Additionally, XML is highly modular and extensible. XML provides a self describing and extensible mechanism, and although not media centric, can provide a reasonable starting basis. Another major advantage of using XML is that it allows the descriptions to be self-describing, in the sense that they combine the description and the structure of the description in the same format and document. XML also provides the capability to import external document type definitions (or DTDs), e.g., for feature descriptors, into the image description scheme document type definitions in a highly modular and extensible way.

According to the exemplary embodiment of the invention, each multimedia component description can include multimedia component objects. Each multimedia component object has one or more associated multimedia component features. The multimedia component features of an object are grouped together as being visual, audio or a relationship on semantic or media. In the multimedia component description scheme, each feature of an object has one or more associated descriptors.

The multimedia description scheme also includes specific document type definitions, also generated using the XML framework, to provide example descriptors. The document type definition provides a list of the elements, tags, attributes, and entities contained in the document, and their relationships to each other. Document type definitions specify a set of rules for the structure of a document. For example, a document type definition specifies the parameters needed for certain kinds of documents. Using the multimedia description scheme, document type definitions may be included in the file that contain the document they describe. In such a case, the document type definition is included in a document's prolog after the XML declaration and before the actual document data begins. Alternatively, the document type definition may be linked to the file from an external URL. Such external document type definitions can be shared by different documents and Web sites. In such a way, for a given descriptor, the multimedia description scheme can provide a link to external descriptor extraction code and descriptor similarity code.

Audiovisual material that has MPEG-7 data associated with it, may include still pictures, graphics, 3D models, audio, speech, video, and information about how these elements are combined in a multimedia presentation, i.e., scenario composition information. A special case of this general data type may include facial expressions and personal characteristics.

FIG. 1A is a block diagram of an exemplary multimedia description integration system 100. The multimedia integration description system 100 includes global media description unit 110, local media description unit 120, integration descriptors unit 150, multimedia integration description scheme unit 160, and multimedia integration description generator 165.

The global media description unit 110 includes a global description generation unit 115 which receives multimedia content and provides global descriptions to the integration descriptors unit 150. The global descriptions provided to the integration descriptors unit 150 are descriptions that are relevant to the multimedia content as a whole, such as time, duration, space, etc. The local media description unit 120 includes description generation units for various categories of multimedia content including image description generation unit 125, video description generation unit 130, audio description generation unit 135, synthetic audiovisual description generation unit 140 and text description generation unit 145.

While FIG. 1A illustrates the relationship between the integration description scheme and five categories of single media descriptions, one skilled in the art may appreciate that these categories are exemplary and therefore, may be subdivided or reclassified into a greater or lesser number of categories. In that regard, the exemplary embodiment illustrated in FIG. 1A illustrates how multimedia content can be divided and categorized into 5 various descriptions categories.

The multimedia integration description scheme unit 160 contains description schemes for integrating one or more of the description categories. In other words, the multimedia integration description scheme unit 160 maps how image, video, audio, synthetic and/or text descriptions, as descriptions of the component objects of a multimedia object, should be combined to form the description of the composite multimedia object and to be stored for easy retrieval. The multimedia integration description scheme unit 160 also provides input to the integration descriptors unit 150 so that it can provide proper descriptor values to the multimedia integration description generator 165.

The multimedia integration description generator 165 generates a multimedia integration description based on the one or more of the image, video, audio, synthetic and/or text descriptions received from the description generation units 125-145, the descriptor values received from the integration descriptors unit 150 and the multimedia integration description scheme received from the multimedia integration description scheme unit 160. The multimedia integration description generator 165 generates the multimedia integration description and stores the description in the database 170.

Once the multimedia integration description has been stored, a user terminal 180, for example, may request multimedia content from a search engine 175. The search engine 175 then retrieves the multimedia content descriptions, whose multimedia integration descriptions meet what the user requested, from the database 170 and provides the retrieved multimedia content descriptions to the user at terminal 180.

Figure 1B:
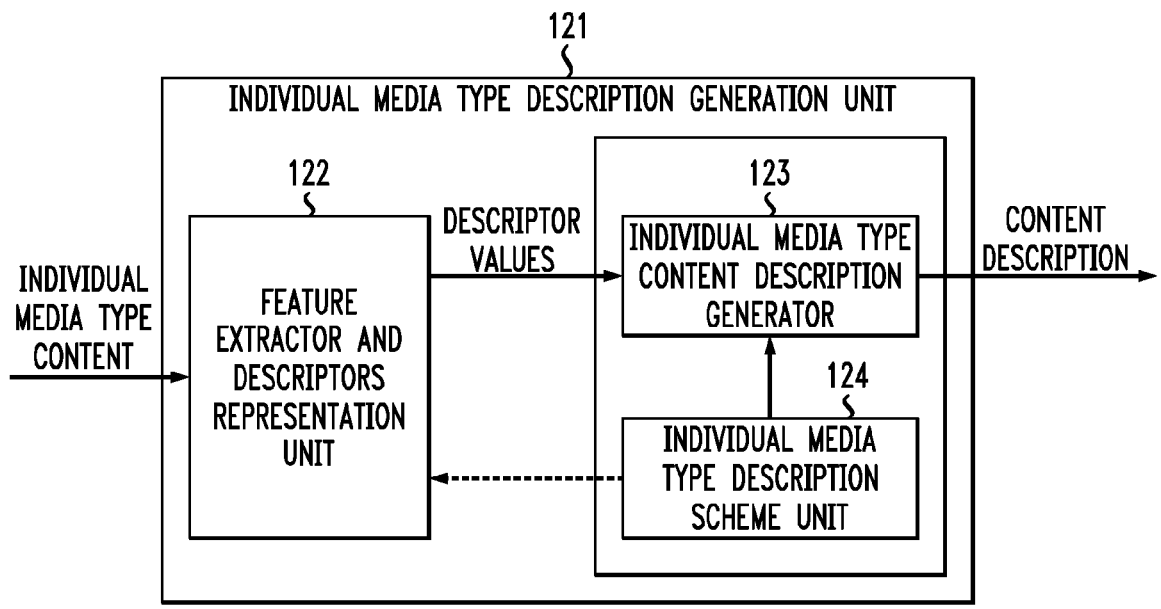
FIG. 1B is an exemplary block diagram of an exemplary individual media type descriptor generation unit shown in FIG. 1A.

FIG. 1B is an exemplary block diagram of one of the individual media type descriptor generation units (i.e., the image, video, audio, synthetic and text description generation units 125-145) shown in FIG. 1A. The individual media type description generation unit 121 includes a feature extractor and descriptors representation unit 122, an individual media type content description generator 123, and individual media type description scheme unit 124.

The feature extractor and descriptors representation unit 122 receives individual media type content and extract features from the content. The extracted features are represented by descriptor values which are output to the individual media type content description generator 123. The individual media type content description generator 123 uses the individual media type description scheme provided by the individual media type description scheme unit 124 and the descriptor values provided by feature extractor and descriptors representation unit 122 to output the content description which is sent to the multimedia integration description generator 165, shown in FIG. 1A.

Figure 2:
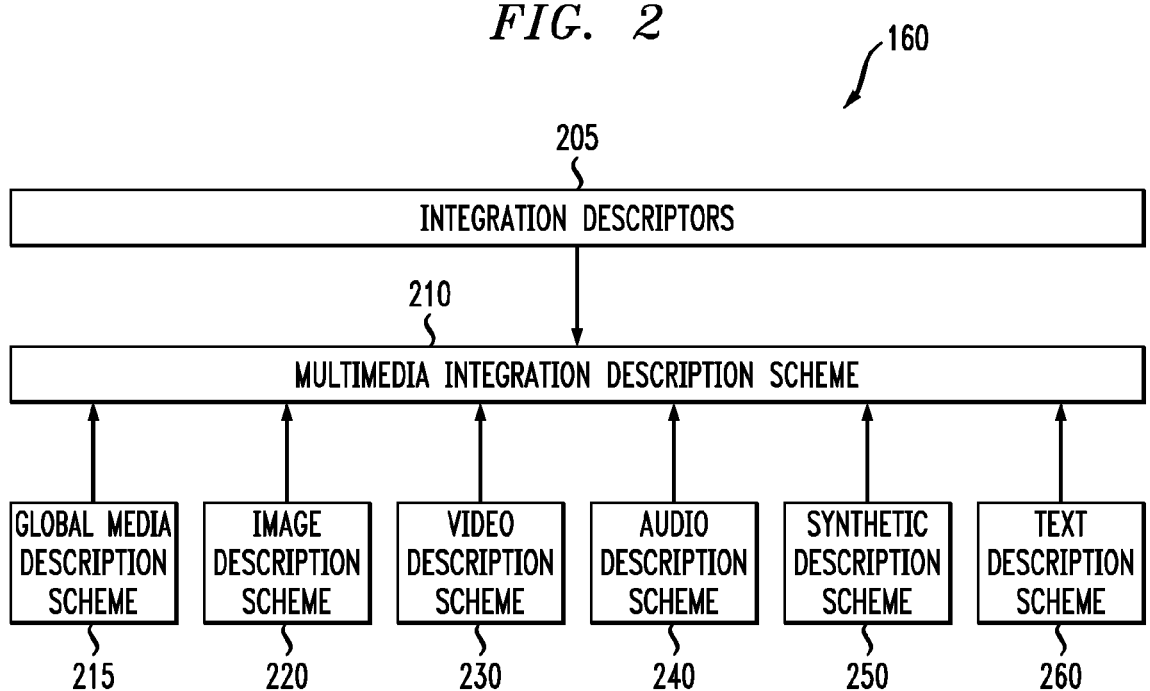
FIG. 2 is an exemplary block diagram of the multimedia integration description scheme unit in FIG. 1A.

FIG. 2 shows the multimedia integration scheme unit 160. The multimedia integration scheme unit 160 interacts with a global media description scheme 115, an image description scheme 220, a video description scheme 230, an audio description scheme 240, a synthetic audiovisual description scheme 250 and a text description scheme 260, which provide description schemes inputs to the multimedia integration description scheme 210. The multimedia integration description scheme 210 also receives input from integration descriptors 205.

In this manner, the integration descriptors 205 and the description schemes 215-260 provide individual maps for each category of multimedia content. The description schemes 220-260 provide description schemes for individual multimedia categories which are integrated into a composite multimedia description scheme 210. The multimedia integration description scheme 210 is used by the multimedia integration description generator 165 to generate a multimedia integration description for the multimedia content which is then stored in the database 170 for future retrieval by search engine 175.

The multimedia integration description scheme (or MMDS) 210 describes multimedia content which may contain composing data from different media type, such as images, natural video, audio, synthetic video, and text. The multimedia integration description scheme 210 is configured to meet the requirements for multimedia integration description schemes specified by MPEG-7, for example, and is independent of any description definition language. The multimedia integration description scheme 210 is also configured to achieve the maximum synergy with the separate description schemes, such as the image, video, audio, synthetic, and text description schemes 220-260.

In the multimedia integration description scheme 210, a multimedia stream is represented as a set of relevant multimedia objects that can be further organized by using object hierarchies. Relationships among multiple multimedia objects that can not be expressed using a tree structure are described using entity relation graphs. Multimedia objects can include multiple features, each of which can contain multiple descriptors. Each descriptor can link to external feature extraction and similarity matching code. Features are grouped according to the following categories: media features, semantic features, and temporal features.

At the same time, each multimedia object includes a set of single-media objects, which together form the multimedia object. Single-media objects are associated with features, hierarchies, entity relation graphs, and multiple abstraction levels, as described by single media description schemes (image, video, etc.). Multimedia objects are an association of multiple single-media objects, for example, a video object corresponding to a person, an audio object corresponding to his speech and the text object corresponding to the transcript.

The multimedia integration description scheme 210 includes the flexibility of the object-oriented framework which is also found in the individual media description schemes. The flexibility is achieved by (1) allowing parts of the description scheme to be instantiated; (2) using efficient categorization of features and clustering of objects (using the indexing hierarchy, for example); and (3) supporting efficient linking, embedding, or downloading of external feature descriptor and execution codes.

Elements defined in the multimedia integration description scheme 210 can be used to derive new elements for different domains. As mentioned earlier, it has been used in description scheme for specific domain (e.g., home media).

One unique aspect of the multimedia integration description scheme 210 is the capability to define multiple abstraction levels based on any arbitrary set of criteria. The criteria can be specified in terms of visual features (e.g., size), semantic relevance (e.g., relevance to user interest profile), or service quality (e.g., media features).

The multimedia integration description scheme 210 aims at describing multimedia content resulting from integration of multiple media streams. Examples of individual media streams are images, audio sequences, natural video sequences, synthetic video sequences, and text data. An example of such integrated multimedia stream is a television program that includes video (both natural and synthetic), audio, and text streams.

Under the multimedia integration scheme, a multimedia stream is represented as a set of multimedia objects that include objects from the composing media streams. Multimedia objects are organized in object hierarchies or in entity relation graphs. Relationships among two or more multimedia objects that can not be expressed in a tree structure can be described using multimedia entity relation graphs. The tree structures can be efficiently indexed and traversed, while the entity relation graphs can model general relationships.

The multimedia integration description scheme 210 builds on top of the individual media description schemes, including the image, video, audio, synthetic and text description schemes. All elements and structures used in the multimedia integration description scheme 210 are intuitive extensions of those used in individual media description schemes.

Figure 3:
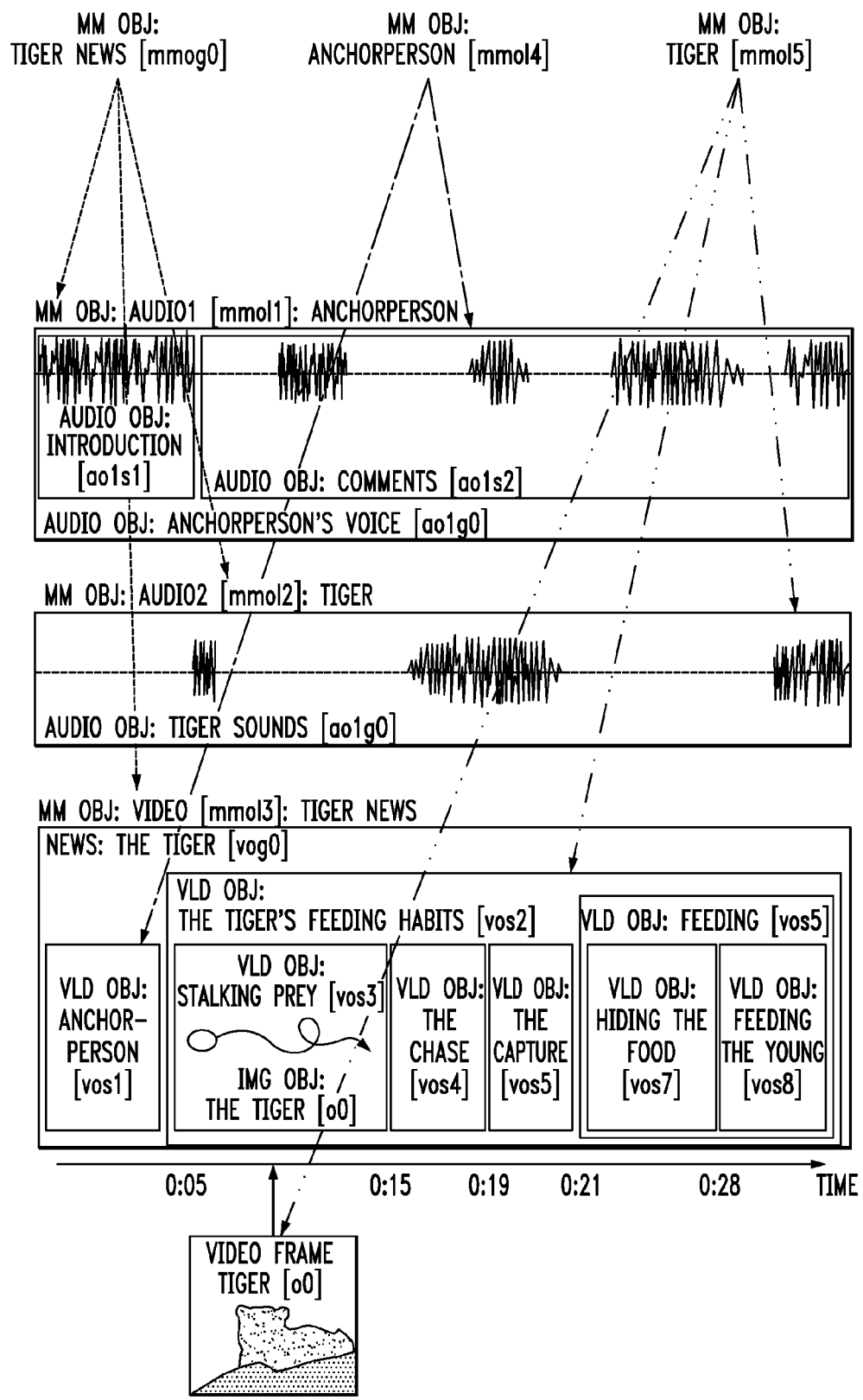
FIG. 3 is an example of a multimedia stream, consisting of multimedia objects and single-media objects, and the relationship among these objects.

FIG. 3 is the example showing the basic elements and structures of the multimedia integration description scheme 210. The explanation will include example XML with the specific document type definition declarations included in Appendix A. A more complete listing of the XML description of the multimedia stream in FIG. 3 is included in Appendix B.

Figure 4:
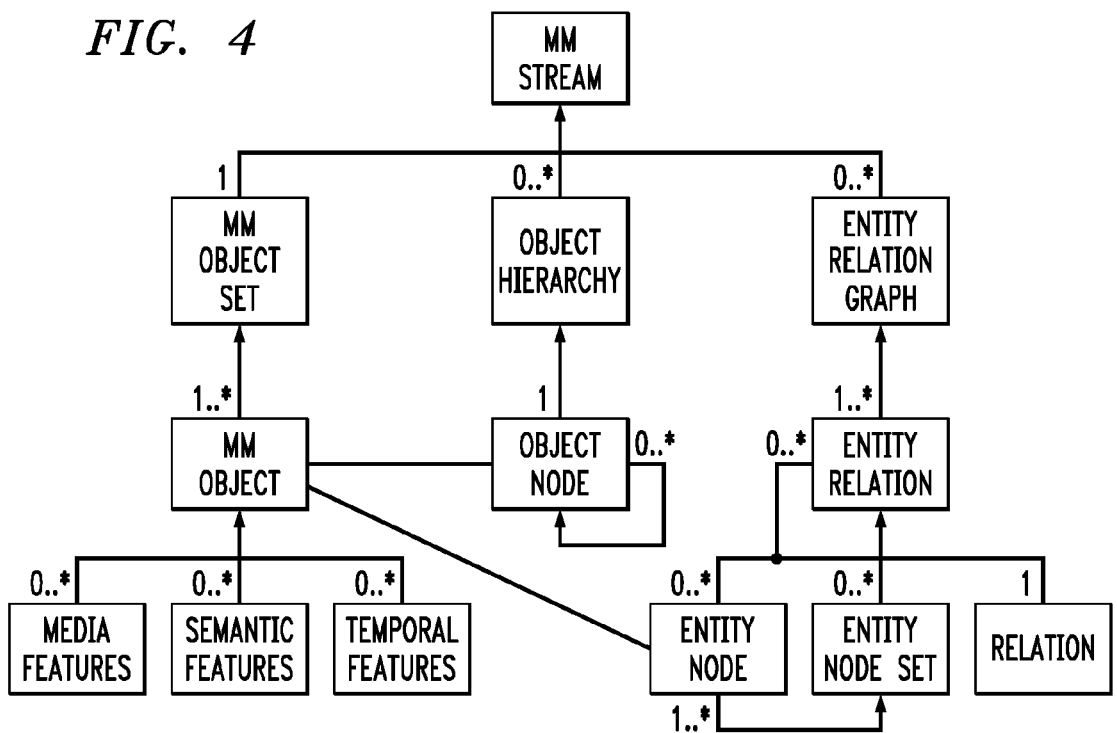
FIG. 4 is a UML representation of the multimedia description scheme at the multimedia stream level which consists of one or more multimedia objects.
Figure 5:
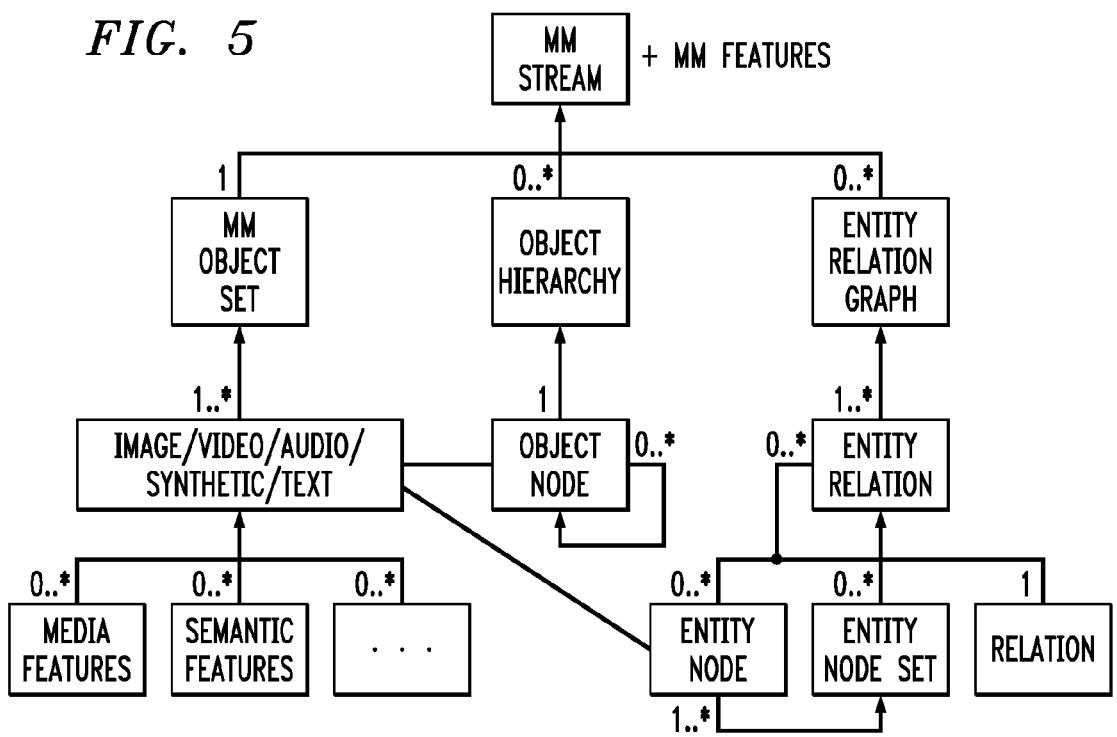
FIG. 5 is a UML representation of the multimedia description scheme at the multimedia object level.

FIGS. 4 and 5 show the graphical representation of the proposed multimedia description scheme following the UML notations. FIGS. 4 and 5 clearly show the relationships of the multimedia description scheme 210 with description schemes 220-260 for individual media. It should be emphasized that the same structure is used at the multimedia object level and the single-media object level for the description schemes of the individual media: image, video, etc.

The multimedia stream element (<MM_Stream>) refers to the multimedia content being described. The multimedia stream is represented as one set of multimedia objects (<MM_Object_Set>, zero or more object hierarchies (<Object_Hierarchy>), and zero or more entity relation graphs (<Entity_Relation_Graph>). Each one of these elements is described in detail below.

The multimedia stream element can include a unique identifier attribute ID. Descriptions of archives containing multimedia streams will use these IDs to reference multimedia streams.

An example of use a multimedia stream element is expressed in XML follows:
<!-- A multimedia Stream -->
<MM_Stream id="mmstream11">
<!-- One multimedia object set -->
<MM_Object_Set> </MM_Object_Set>
<!-- Multiple object hierarchies -->
<Object_Hierarchy> </Object_Hierarchy>
. . .
<!-- Multiple entity relation graphs -->
<Entity_Relation_Graph> </Entity_Relation_Graph>
. . .
</MM_Stream>

The basic description element of the multimedia description scheme is the multimedia object element (<MM_Object>). The set of all the multimedia objects in a multimedia stream is included within the multimedia object set (<MM_Object_Set>).

A multimedia object element includes a collection of single-media objects from one or more media streams that together form a relevant entity for searching, filtering, or presentation. These single-media objects may be from the same media stream or different media streams. Usually, single-media objects are from different media (e.g., audio, video, and text). These elements are defined in the description scheme of the corresponding media and may have associated hierarchies or entity relation graphs. For purposes of discussion, the definition of multimedia object also allows single-media objects of the same media type to be used. The single-media objects in a multimedia object do not need to be synchronized in time. In the following, "single-media object" and "media object" are used interchangeably.

The composing media objects (<Image_Object>, <Video_Object>, etc) inside a multimedia object are included in a media object set element (<Media_Object_Set>). A multimedia object element can also include zero or more object hierarchy elements (<Object_Hierarchy>) and entity relation graph elements (<Entity_Relation_Graph>) to describe spatial, temporal, and/or semantic relationships among the composing media objects.

Each multimedia object can have associated multiple features and corresponding feature descriptors, as discussed above. A multimedia object can include semantic information (e.g. annotations), temporal information (e.g. duration), and media specific information (e.g. compression format).

Two types of multimedia objects are used: local and global objects. A global multimedia object element represents the entire multimedia stream. On the other hand, a local multimedia object has a limited scope within the multimedia stream, for example, an arbitrarily shaped video object representing a person and a segmented audio object corresponding to his speech. To differentiate among local and global multimedia object, the multimedia object element includes a required attribute type, whose value can be LOCAL or GLOBAL. Only one multimedia object with a GLOBAL type will be included a multimedia stream description.

Each multimedia object element can also have four optional attributes: ID, Object_Ref. Object_Node_Ref, and Entity_Node_Ref. ID (or id) is a unique identifier of the multimedia object within the multimedia stream description. When the multimedia object acts as placeholder (i.e., no feature descriptors included) of another multimedia object, Object_Ref references that multimedia object. Object_Node_Ref and Entity_Node_Ref include the lists of the identifiers of object node elements (<Object_Node>) and entity node elements (<Entity_Node>) that reference the multimedia object element, respectively.

Below, an example showing how these elements will be used in XML is included. FIG. 3 includes examples of global multimedia objects (mmog0), local multimedia objects (mmol1, mmol2, etc), and media objects (ao1g0, vog0, o0, etc). See Appendix B for the XML of the example in FIG. 3.

```
<!-- A multimedia object set element -->
<MM_Object_Set>
<!-- One or more multimedia objects -->
<MM_Object   type="GLOBAL"   id="MMobjt1"
    Object_Node_Ref="ON1"
    Entity_Node_Ref="EN1" . . . >
<!-- A media object set -->
<Media_Object_Set> </Media_Object_Set>
<!-- Multiple object hierarchies -->
<Object_Hierarchy> </Object_Hierarchy>
 . . .
<!-- Multiple entity relation graphs -->
<Entity_Relation_Graph> </Entity_Relation_Graph>
 . . .
<!-- Zero or one multimedia object media feature element
    -->
<MM_Obj_Media_Features>   </MM_Obj_Media_Features>
<!-- Zero or one multimedia object semantic feature element -->
<MM_Obj_Semantic_Features>   </MM_Obj_Semantic_Features>
<!-- Zero or one multimedia object temporal feature element -->
<MM_Obj_Temporal_Features> </MM_Obj_Temporal_Features>
</MM_Object>
<MM_Object   type="LOCAL"   id="Mmobj2"
    Object_Node_Ref="ON2 ON10"
    Entity_Node_Ref="EN2 EN4 EN7" . . . >
<!-- Content of MM Object -->
</MM_Object>
 . . .
</MM_Object_Set>
```

The set of all the single-media object elements (<Video_Object>, <Image_Object>, etc.) composing a multimedia object are included in the media object set element (<Media_Object_Set>). Each media object refers to one type of media, such as image, video, audio, synthetic video, and text. These media objects are defined in the description scheme of the corresponding type of media. It is important to point out that the single-media objects and the multimedia objects share very similar structures at multiple levels although the features are different.

In the same fashion as the multimedia objects, relationships among single-media objects can be described using media object hierarchies or entity relation graphs. Although entity relation graphs may lack the retrieval and transversal efficiency of hierarchical structures, it is used when efficient hierarchical tree structures are not adequate to described specific relationships. Note that media object hierarchies may include media objects of different media types.

In the multimedia integration description scheme 210, each multimedia object can contain three multimedia object feature elements that group features based on the information they convey: media (<MM_Obj_Media_Features>), semantic (<MM_Obj_Semantic_Features>), and temporal (<MM_Obj_Semantic_Features>) information. Note that features associated with spatial positions of individual media objects (e.g., positions of video objects) are included in each specific single-media object. Spatial relationships among single-media objects inside a multimedia object are described using the entity relation graphs. Table 1 includes examples of features for each feature type:

TABLE 1

Examples of feature classes and features.

| Feature Class | Features |
| --- | --- |
| Media | Data Location, Scalable Representation, Modality Transcoding[1] |
| Semantic | Text Annotation[1], Who[1], What Object[1], What Action[1], Why[1], When[1], Where[1], Keywords |
| Temporal | Duration |

[1]Defined in Image description scheme.

Each multimedia object feature element includes corresponding descriptor elements. Specific descriptors can include links to external extraction and similarity matching code. External document type definitions for descriptors can be imported and used in the current multimedia description scheme. In this framework, new features, types of features, and descriptors can be included in an extensible and modular way.

In Appendix A, the declarations of the following example features are included: Data_Location, Scalable_Representation, Text_Annotation, Keywords, and Duration.

Each object hierarchy element (<Object_Hierarchy>) includes one object node element (<Object_Node>). An object hierarchy element can include a unique identifier as an attribute ID, for referencing purposes. It can also include an attribute type, to describe the type of binding (e.g., semantic) expressed by the hierarchy.

At the same time, an object node element (<Object_Node>) includes zero or more object node elements forming a tree structure. Each multimedia object node references a multimedia object in the multimedia object set through an attribute, Object_Ref. by using the latter's unique identifier. Each object node element can also include a unique identifier in the form of an attribute ID. By including the object nodes' unique identifiers in their Object_Node_Ref attributes, multimedia objects can point back to object nodes referencing them. For efficient transversal of the multimedia description, this mechanism is provided to traverse from multimedia objects in the multimedia object set to corresponding object nodes in the object hierarchy and vice versa.

The hierarchy is a way to organize the multimedia objects in the multimedia object set. The multimedia objects in a multimedia stream can be organized based on different criteria: the temporal relationships, the semantic relationships, and the value of one or more features. The top object of each multimedia object hierarchy can specify the criteria followed to generate the hierarchy. An example multimedia object hierarchy is detailed in XML below:

```
<!-- Object hierarchy element -->
<Object_Hierarchy id=" ">
<!-- One object node -->
<Object_Node id=" "Object_Ref=" . . . "
    <!-- Multiple object nodes -->
    <Object_Node id=" . . . " Object_Ref=" . . . ">
        . . .
    </Object_Node>
    . . .
</Object_Node>
 . . .
</Object_Hierarchy>
```

Although a hierarchy is adequate for many purposes (e.g., A is the father of B) and is efficient in retrieval, some relationships among multimedia objects can not be expressed using a hierarchical structure (e.g., A is talking to B). For purposes of this discussion, the multimedia description scheme 210 also allows the specification of more complex relations among multimedia objects using an entity relation graph.

An entity relation graph element (<Entity_Relation_Graph>) includes one or more entity relation elements (<Entity_Relation>). It has two optional attributes, a unique identifier ID, and a string to describe the binding expressed by the graph, type.

An entity relation element (<Entity_Relation>) must include one relation element (<Relation>), zero or more entity node elements (<Entity_Node>), zero or more entity node set elements (<Entity_Node_Set>), and zero ore more entity relation elements (<Entity_Relation>). An optional attribute can be included in an entity relation element, type, to describe the type of relation it expresses.

Each entity node element references a multimedia object in the multimedia object set through an attribute, Object_Ref. by using the latter's unique identifier. Each entity node element can also include a unique identifier in the form of an attribute ID. By including the entity nodes' unique identifiers in their Entity_Node_Ref attributes, multimedia objects can point back to object nodes referencing them. For efficient transversal of the multimedia description, this mechanism is provided to traverse from multimedia objects in the multimedia object set to corresponding entity nodes in the ER graph and vice versa.

Hierarchies and entity relation graphs can be used to state spatial, temporal, and semantic relationships among media objects. Examples of such types of relationships are described below. In addition, the use of entity relation graphs is also described in more detail.

```
<Entity_Relation_Graph type="TEMPORAL.SMIL"¹>
    <Entity_Relation type="TEMPORAL">
        <Relation With_Respect_To="MediaObject1">
            <Temporal_Sequential pattern="DELAY" />
        </Relation>
        <Entity_Node Media_Object Ref="MediaObject1" />
        <Entity_Node Media_Object Ref="MediaObject2"
Start_Time="2"/>
        <Entity_Relation>
            <Relation type="TEMPORAL">
                <Temporal_Parallel />
            </Relation>
            <Entity_Node Media_Object_Ref="MediaObject3" />
            <!-- Optional start or end time -->
            <Entity_Node Media_Object_Ref="MediaObject4" />
```

¹In this example, SMIL temporal models are used.

```
        </Entity_Relation>
    </Entity_Relation>
</Entity_Relation_Graph>
<Entity_Relation_Graph type="SPATIAL.2DSTRING">
    <Entity_Relation type="SPATIAL">
        <Relation With_Respect_To="MediaObject1">
            <Spatial_Arrangement At_Time="3>
                <Spatial_Relevance pattern ="Upper_Right_Of"
/>
            </Spatial_Arrangement>
        </Relation>
```

-continued

```
        <Entity_Node Media_Object_Ref="MediaObject1" />
        <Entity_Node Media_Object_Ref="MediaObject2" />
        <Entity_Node Media_Object_Ref="MediaObject3" />
    </Entity_Relation>
    <Entity_Relation type="SPATIAL">
        <Relation With_Respect_To="MediaObject2">
            <Spatial_Arrangement At_Time=3>
                <Spatial_Relevance pattern="Lower_Left_Of"
/>
            </Spatial_Arrangement>
        </Relation>
        <Entity_Node Media_Object Ref="MediaObject3" />
        <Entity_Node Media_Object Ref="MediaObject1" />
        <Entity_Node Media_Object Ref="MediaObject2" />
    </Entity_Relation>
</Entity_Relation_Graph>
```

The content of the relation could be particularized for each different scenario. In Appendix A, temporal, spatial, and semantic relations are included. Similar types of relations could be added as needed. Acceptable relationships for specific applications can be defined in advance. The content of this element states the relation among the entity nodes included in that entity relation element.

Many different types of relations can be declared among multiple objects in the object set; spatial (topological or directional), temporal (topological or directional), semantic are just some type examples. An example of entity relation graph was included above to show how these structures could be used to describe temporal and spatial relationships among media objects. The same example is also valid for multimedia objects (Appendix B).

Figure 6:
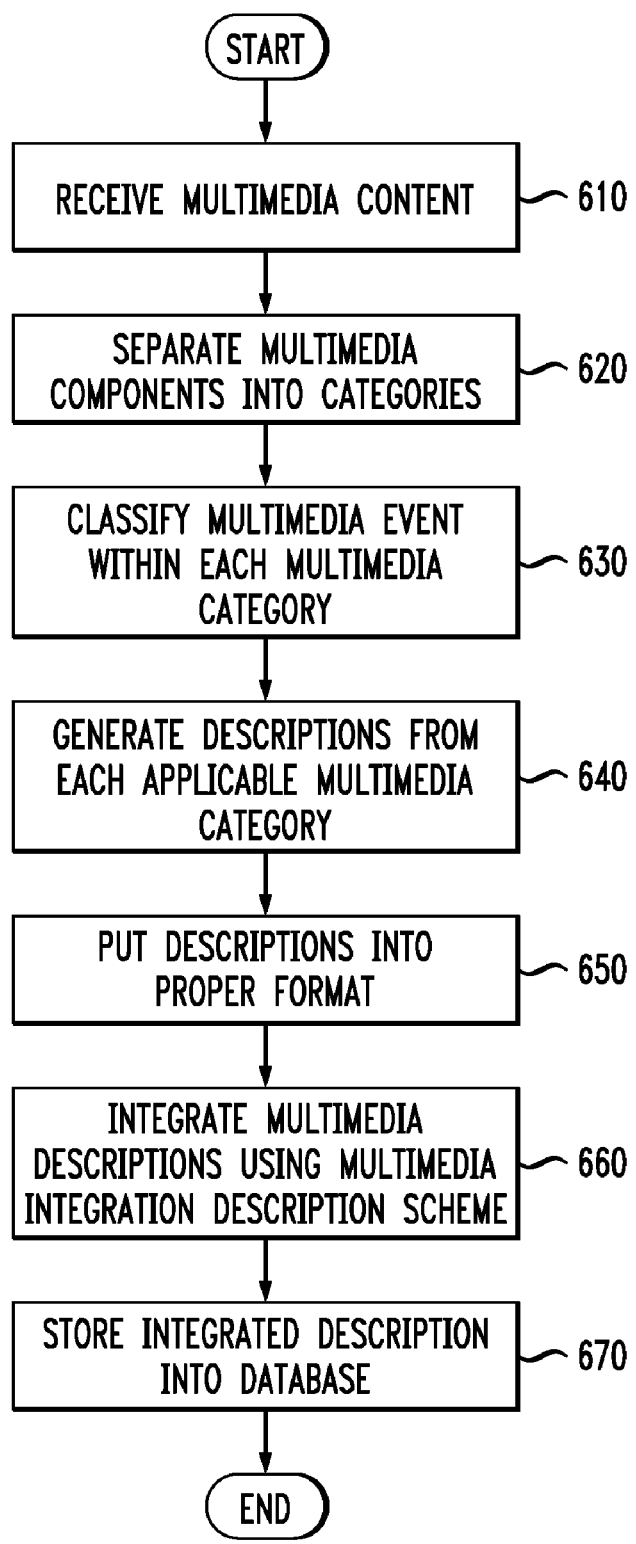
FIG. 6 is an exemplary flowchart showing the process of generating integrated multimedia content description for multimedia content.

FIG. 6 is an exemplary flowchart of the multimedia integration description process. The process begins in step 610, multimedia content is received by the global description generator 115 and one or more of the image description generator 125, video description generator 130, audio description generator 135, synthetic description generator 140 and the text description generator 145. In step 620, the multimedia components are separated and at step 630 the single media event is classified within each of the multimedia categories in the description generators 125-145.

In step 640, the description generators 125-145 generate descriptions from each respective multimedia category which are then forwarded to the multimedia integration description generator 165. In step 650, the multimedia integration description generator 165 puts the descriptions into the proper format using the multimedia integration description scheme provided by the multimedia integration description scheme unit 170.

Then, in step 660, the multimedia integration description generator 165 integrates the multimedia descriptions and in step 670, the integrated descriptions are stored in database 160. The process then ends.

While the invention has been described with reference to the embodiments, it is to be understood that the invention is not restricted to the particular forms shown in the foregoing embodiments. Various modifications and alternations can be made thereto without departing from the scope of the invention.

APPENDIX A

Document Type Definition of Multimedia Integration
Description Scheme

MM_integration_ds.dtd

```
<!-- Multimedia Integration Description Scheme -->
<!ELEMENT MM_Stream ( MM_Object_Set, Object_Hierarchy*,
Entity_Relation_Graph* )>
<!ATTLIST MM_Stream
        id ID #IMPLIED>
<!-- This is how external DTDs are included in the current DTD -->
<!-- External Video DS DTD -->
<!ENTITY % Video_DS SYSTEM "video_ds.dtd">
%Video_DS;
<!—External Audio DS DTD -->
<!ENTITY % Audio_DS SYSTEM "audio_ds.dtd">
%Audio_DS;
<!—External Text DS DTD -->
<!ENTITY % Text_DS SYSTEM "text_ds.dtd">
%Text_DS;
<!—External Synthetic DS DTD -->
<!ENTITY % Synthetic_DS SYSTEM "synthetic_ds.dtd">
%Synthetic_DS;
<!—External Image DS DTD -->
<!ENTITY % Image_DS SYSTEM "image_ds.dtd">
%Image_DS;
<!ELEMENT MM_Object_Set ( MM_Object+ )>
<!ELEMENT MM_Object ( Media_Object_Set, Object_Hierarchy*,
Entity_Relation_Graph*,
                       MM_Obj_MediaFeatures?, MM_Obj_Semantic_Features?,
                       MM_Obj_Temporal_Features? )>
<!ATTLIST MM_Object
        Object Type       (LOCAL|GLOBAL)   #REQUIRED
        id                ID               #IMPLIED
        Object_Ref        IDREF            #IMPLIED
        Object_Node_Ref   IDREFS           #IMPLIED
        Entity_Node_Ref   IDREFS           #IMPLIED>
<!ELEMENT Media_Object_Set ( Audio Object | Image_Object | Video_Object |
Text_Object
                       Synthetic_Object )+ >
<!-- The object hierarchy and the entity relation graph are defined in the Image DS
(Proposal #480). We include them in this DTD for convenience -->
<!-- Object hierarchy element -->
<!-- The attribute type is the hierarchy binding type -->
<!ELEMENT Object_Hierarchy ( Object_Node )>
<!ATTLIST Object_Hierarchy
        id                ID               IMPLIED
        type              CDATA            #IMPLIED>
<!ELEMENT Object_Node ( Object_Node* )>
<!ATTLIST object_node
        id                ID               #IMPLIED
        Object_Ref        IDREF            #REQUIRED>
<!-- Entity relation graph element-->
<!-- Possible types of entity relations and entity relation graphs:
     - Spatial: topological, directional
     - Temporal: topological, directional
     - Semantic -->
<!ELEMENT Entity_Relation_Graph ( Entity_Relation+ )>
<!ATTLIST Entity_Relation_Graph
        id                ID               #IMPLIED
        type              CDATA            #IMPLIED>
<!ELEMENT Entity_Relation (Relation, (Entity | Node | Entity_Node_Set |
Entity_Relation)* )>
<!ATTLIST Entity_Relation
        type              CDATA            #IMPLIED>
<!ELEMENT Entity_Node (#PCDATA)>
<!ATTLIST Entity_Node
        id                ID               #IMPLIED
        Object_Ref        IDREF            #REQUIRED>
<!ELEMENT Entity_Node_Set ( Entity_Node+ )>
<!ELEMENT Relation Temporal_Parallel| Temporal_Sequential |
                       Spatial_Alignment | Spatial_Arrangement |
                       Semantic_Relation | code)*>
```

-continued

```
<!ATTLIST    Relation
             With_Respect_To    IDREF     #IMPLIED >
<!ELEMENT    Temporal_Parallel      EMPTY >
<!ELEMENT    Temporal_Sequential    EMPTY>
<!ATTLIST    Temporal_Sequential
             Pattern   (EXACT|DELAY|PRIOR)       "EXACT" >
<!ELEMENT    Spatial_Alignment EMPTY >
<!ATTLIST    Spatial_Alignment
             Pattern (Left_Align | Right Align |
                     Top_Align | Bottom_Align)           "Left_Align"
             At_Time    CDATA                    #IMPLIED >
<!ELEMENT    Spatial_Arrangement ( Spatial_Relevance | Spatial_Positioning )? >
<!ATTLIST    Spatial_Arrangement
             At_Time    CDATA    #IMPLIED >
<!ELEMENT    Spatial_Relevance EMPTY >
<!ATTLIST    Spatial_Relevance
             Pattern (Top_Of | Bottom_Of | Left_Of | Right_Of |
                     Upper_Left_Of | Upper_Right_Of | Lower_Left_Of |
                     Lower_Right_Of |
                     Adjacent_To | Neighboring_To | Near_By |
                     Within | Contained_In )             "Top_Of" >
<!ELEMENT    Spatial_Positioning EMPTY >
<!ATTLIST    Spatial_Positioning
             Horizontal_Shift       CDATA     #IMPLIED
             Vertical_Shift         CDATA     #IMPLIED >
<!ELEMENT    Semantic_Relation (Keywords* | code*)? >
<!ELEMENT MM_Obj_Media_Features ( Data_Location?, Scalable_Representation?,
                     Modality_Transcoding?)>
<!ELEMENT MM_Obj_Semantic_Features ( Text_Annotation?, Keywords? )>
<!ELEMENT MM_Obj_Temporal_Features ( Duration? )>
<!ELEMENT    Keywords ( Word*, Code* ) >
<!ATTLIST    Keywords
             No-Words           CDATA                #REQUIRED
             Language           CDATA                "English"
             Extraction_Manner  (AUTOMATIC|MANUAL)   "MANUAL">
<!ELEMENT    Duration    (
             Image_Duration?,
             Audio_Duration?,
             Video_Duration?,
             Text_Duration?,
             Synthetic_Duration? ) >
<!ATTLIST    Duration
             Synchronized_Overall_Duration CDATA #IMPLIED >
<!ELEMENT    Image_Duration       (Time)>
<!ELEMENT    Audio_Duration       (Time)>
<!ELEMENT    Video_Duration       (Time)>
<!ELEMENT    Synthetic_Duration   (Time)>
<!ELEMENT    Text_Duration        (Time? | Alignment? )>
<!ELEMENT    Alignment            EMPTY >
<!ATTLIST    Alignment
             with (IMAGE|AUDIO|VIDEO|SYNTHETIC)          "AUDIO">
<!ELEMENT    Data_Location(
             Image_Location?,
             Audio_Location?,
             Video_Location?,
             Text_Location?,
             Synthetic_Location?) >
<!ELEMENT    Image_Location       (location) >
<!ELEMENT    Audio_Location       (location) >
<!ELEMENT    Video_Location       (location) >
<!ELEMENT    Text_Location        (location) >
<!ELEMENT    Synthetic_Location   (location) >
<!ELEMENT    Scalable_Representation    (
             Static_Sampled?,
             Dynamic_Condensed?)>
<!ELEMENT    Static_Sampled   (
             Image_Condensed?,
             Video_Static_Pictures?,
             Audio_Clips?,
             Synthetic_Pictures?) >
<!ELEMENT    Image_Condensed ( Location*, Image_Scl*, Image_Subsampling* ) >
<!ELEMENT    Image_Subsampling ( Image_Subsampling_Para, code)* >
<!ELEMENT    Image_Subsampling_Para EMPTY >
<!ATTLIST    Image_Subsampling_Para
             Scheme         CDATA    #REQUIRED
             Spatial_Rate   CDATA    #REQUIRED
             Frame_Size     CDATA    #IMPLIED >
<!ELEMENT    Video_Static_Pictures (Key_Frame* ) >
<!ATTLIST    No_KFs       CDATA #REQUIRED >
```

-continued

```
<!ELEMENT   Audio_Clips (Audio_Object* | Audio_Hierarchy*) >
<!ATTLIST   No_Clips       CDATA #REQUIRED >
<!ELEMENT   Synthetic_Pictures (Key Frame)* >
<!ATTLIST   No-KFs         CDATA #REQUIRED >
<!ELEMENT   Dynamic_Condensed (
            Visual_Condensed?,
            Audio_Condensed?,
            Text_Condensed?,
            Synthetic_Condensed?) >
<!ELEMENT   Visual_Condensed ( Location*, Video_Scl*, Video_Subsampling* ) >
<!ELEMENT   Video_Subsampling    ( Video_Subsampling_Para, code)* >
<!ELEMENT   Video_Subsampling_Para EMPTY >
<!ATTLIST   Video_Subsampling_Para
            Scheme         CDATA #REQUIRED
            Temporal_Rate  CDATA #IMPLIED
            Spatial_Rate   CDATA #IMPLIED
            Frame_Size     CDATA #IMPLIED >
<!ELEMENT   Audio Condensed (Location*,
                             Audio_Compressed*,
                             Audio_Subsampling*,
                             Audio_Timescaled*) >
<!ELEMENT   Audio_Compressed ( Audio_Compress_Para, code )* >
<!ELEMENT   Audio_Compress Para EMPTY >
<!ATTLIST   Audio_Compress_Para
            Scheme   CDATA #REQUIRED
            Bitrate  CDATA #IMPLIED>
<!ELEMENT   Audio_Subsampling ( Audio_Subsampling_Para, code)* >
<!ELEMENT   Audio_Subsampling_Para EMPTY >
<!ATTLIST   Audio_Subsampling_Para
            Scheme         CDATA #REQUIRED
            Temporal_Rate  CDATA #IMPLIED >
<!ELEMENT   Audio_Timescaled (Audio_Timescale_Para, code)* >
<!ELEMENT   Audio_Timescale_Para EMPTY >
<!ATTLIST   Audio_Timescale_Para
            Scale_Rate     CDATA #REQUIRED >
<!ELEMENT   Text_Condensed (Text_Abstract*) >
<!ELEMENT   Text_Abstract (Location*, (Text_Abstract_Para, code)*)? >
<!ATTLIST   Text_Abstract
            Length_In_Words      CDATA                    #IMPLIED
            Duration_In_Seconds  CDATA                    #IMPLIED
            Language             CDATA                    "English"
            Generation_Mode      (AUTOMATIC|MANUAL)       "MANUAL" >
<!ELEMENT   Text_Abstract_Para   EMPTY>
<!ATTLIST   Text_Abstract_Para
            Length_In_Words      CDATA                    #IMPLIED
            Language             CDATA                    "English" >
<!ELEMENT   Synthetic_Condensed (Synthetic_Location*,
(Synthetic_Condense_Para, code)*) >
<!ELEMENT   Synthetic_Condense_Para EMPTY >
<!ATTLIST   Synthetic_Condense_Para
            Spatial_Rate    CDATA                         #REQUIRED
            Temporal_Rate   CDATA                         #REQUIRED
            Frame_Size      CDATA                         #REQUIRED
            Bitrate         CDATA                         #IMPLIED >
<!-- Multimedia Integration DS End -->
```

APPENDIX B

XML for Example in FIG. 3

TigerNews.xml:

```
<!-- Tiger News MM Description -->
<MM_Stream id="TigerNews5-28-1000">
    <MM_Object_Set>
        <!-- Tiger News -->
        <MM_Object type="GLOBAL" id="mmog0" Object_Node_Ref="mmon0">
            <MM_Obj_Semantic_Features>
                <who><concept>Anchorperson: S. Paek </concept></who>
                <what_object><concept> The Tiger </concept></what_object>
```

```xml
                    <what_action>
                        <concept> Tiger is Feeding </concept>
                    </what_action>
                    <where><concept> Nigeria, Africa </concept></where>
                    <when><concept> May 28, 2000 </concept></when>
                    <why><concept> Nature news </concept></why>
                </MM_Obj_Semantic_Features>
                <MM_Obj_Temporal_Features>
                    <Duration>. . . </Duration>
                </MM_Obj_Semantic_Features>
            </MM_Object>
            <!-- Audio 1: Anchorperson -->
            <MM_Object type="LOCAL"   id="mmol1" Object_Node_Ref="mmon1"
                                                 Entity_Node_Ref="mmen1">
                <Media_Object_Set>
                    <!-- Global audio object -->
                    <Audio_Object type="GLOBAL" id="ao1g0"
                                            Object_Node_Ref="mmol1on0">
                    <!-- Features of the audio object: semantics, media,
etc -->
                    </Audio_Object>
                    <!-- Introduction of news report -->
                    <Audio_Object type="SEGMENT" id="ao1s1"
                                            Object_Node_ref="mmol1on1"
                                            Entity_Node_Ref="mmol1en1">
                    <!-- Features of the audio object: semantics, media,
etc -->
                    </Audio_Object>
                    <!-- Comments on news -->
                    <Audio_Object type="SEGMENT" id="ao1s2"
                                            Object_Node_ref="mmol1on2"
                                            Entity_Node_Ref="mmol1en2">
                    <!-- Features of the audio object: semantics, media,
etc -->
                    </Audio_Object>
                </Media_Object_Set>
                <Object_Hierarchy>
                    <Object_Node id="mmol1on0" Object_Ref="ao1g0">
                        <Object_Node id"mmol1on1" Object_Ref="ao1s1"
/>
                        <Object_Node id"mmol1on0" Object_Ref="ao1s2"
/>
                    </Object_Node>
                </Object_Hierarchy>
                <Entity_Relation_Graph type="TEMPORAL">
                    <Entity_Relation>
                        <Relation type="TEMPORAL">
                            <Temporal_Sequential />
                        </Relation>
                        <Entity_Node id="mmol1en1" Objec_Ref="ao1s1"
/>
                        <Entity_Node id="mmol1en2" Objec_Ref="ao1s2"
/>
                    </Entity_Relation>
                </Entity_Relation_Graph>
                <MM_Obj_Media_Features>
                    <Data_Location> . . . </Data_Location>
                </MM_Obj_Media_Features>
                <MM_Obj_Semantic_Features> . . .
</MM_Obj_Semantic_Features>
                <MM_Obj_Temporal_Features> . . .
</MM_Obj_Temporal_Features>
            </MM_Object>
            <!-- Audio 2: Tiger -->
            <MM_Object type="LOCAL" id="mmol2" Object_Node_Ref="mmon2"
                                               Entity_Node_Ref="mmen2">
                <!-- Single-media objects and features -->
            </MM_Object>
            <!-- Video: Tiger News' Video -->
            <MM_Object type="LOCAL" id="mmol3" Object_Node_Ref="mmon3"
                                               Entity_Node_Ref="mmen3">
                <!-- Single-media objects and features -->
            </MM_Object>
            <!-- Anchorperson -->
            <!-- Groups the objects related to Anchorperson across media -->
            <MM_Object type="LOCAL" id="mmol4" . . . >
```

-continued

```
        <Media_Object_Set>
            <Video_Object type="SEGMENT" Object_Ref="vos1" />
            <Audio_Object type="GLOBAL" Object_Ref="ao1g0"/>
        </Media_Object_Set>
    </MM_Object>
    <!-- Tiger -->
    <MM_Object type="LOCAL" id="mmol5" . . . >
        <!-- Object and features -->
    </MM_Object>
</MM_Object Set>
<Object_Hierarchy>
    <Object_Node id="mmon0" Object_Ref="mmog0">
        <Object_Node id="mmon1" Object_Ref="mmol1" />
        <Object_Node id="mmon2" Object_Ref="mmol2" />
        <Object_Node id="mmon3" Object_Ref="mmol3" />
    </Object_Node>
<Object_Hierarchy>
<Entity_Relation_Graph type="TEMPORAL.SMIL">
    <Entity_Relation>
        <Relation_type="TEMPORAL">
            <Temporal_Parallel />
        </Relation>
        <Relation_Node id ="mmen1" Object_Ref="mmol1" />
        <Relation_Node id ="mmen2" Object_Ref="mmol2" />
        <Relation_Node id ="mmen3" Object_Ref="mmol3" />
    <Entity_Relation>
<Entity_Relation_Graph>
</MM_Stream>
<!-- Tiger News MM Description -->
```

We claim:

1. A device for generating description records from media content, the device comprising:
    a processor;
    a module configured to control the processor, based on media content, to generate non-hierarchical entity relation graph descriptions for at least one multimedia type, wherein the non-hierarchical entity relation graph descriptions are associated with communication between multimedia objects and based at least in part on a relationship of media objects selected from the group comprising media feature relationships, semantic feature relationships, and temporal feature relationships; and
    a module configured to control the processor to integrate the multimedia object descriptions and the entity relation graph descriptions to generate at least one description record to represent content embedded within the multimedia content.

2. The device of claim 1, wherein the module configured to control the processor to generate non-hierarchical entity relation graph descriptions for at least one multimedia type based on the media content further:
    identifies multimedia types in multimedia content; and
    extracts multimedia objects to generate multimedia object descriptions from the multimedia content for at least one of the multimedia types, wherein generating non-hierarchical entity relation graph is based on at least in part on the multimedia object descriptions.

3. The device of claim 1, further comprising a module configured to control the processor to generate, from the multimedia content, multimedia object hierarchy descriptions by object hierarchy construction and extraction processing for at least one of the multimedia types.

4. The device of claim 1, wherein the multimedia types include at least one of image, audio, video, synthetic and text.

5. The device of claim 2, wherein the module configured to control the processor to extract multimedia objects further:
    segments multimedia content into segments including content from at least one of the multimedia types for the multimedia content; and
    generates at least one feature description for at least one of the segments by feature extraction and annotation, wherein the generated multimedia object descriptions comprise the at least one feature description for the at least one segment.

6. The device of claim 5, wherein the segments are selected from the group consisting of local segments and global segments.

7. The device of claim 5, further comprising a module configured to control the processor to select the at least one feature description from the group consisting of media, semantic and temporal features.

8. The device of claim 7, wherein the media features are further defined by at least one feature description selected from the group comprising data location, scalable representation and modality transcoding.

9. The device of claim 7, wherein the semantic features are further defined by at least one feature description selected from the group comprising keywords, who, what object, what action, why, when, where and text annotation.

10. The device of claim 7, wherein the temporal features are further defined by at least one feature description consisting of duration.

11. The device of claim 5, wherein the module configured to control the processor to extract the multimedia objects further:
    generates media object descriptions from the multimedia segment for one of the multimedia types by media object extraction processing;
    generates media object hierarchy descriptions from the generated media object descriptions by object hierarchy construction and extraction processing; and
    generates media entity relation graph descriptions from the generated media object descriptions by entity relation graph generation processing.

12. The device of claim 11, wherein the module configured to control the processor to extract media objects that further generates media object description further:
   segments the content of each multimedia type in the multimedia object into segments within the multimedia object by media segmentation processing; and
   generates at least one feature description for at least one of the segments by feature extraction and annotation, wherein the generated media object descriptions comprise the at least one feature description for the at least one of the segments.

13. The device of claim 12, wherein the module configured to control the processor to extract the multi-media objects further selects the at least one feature description from the group consisting of media, semantic and temporal.

14. The device of claim 12, wherein the module configured to control the processor to generate media object hierarchy descriptions further generates media object hierarchy descriptions of the media object descriptions based on media feature relationships of media objects represented by the media object descriptions.

15. The device of claim 12, wherein the module configured to control the processor to generate media object hierarchy descriptions further generates semantic object hierarchy descriptions of the media object descriptions based on semantic feature relationships of media objects represented by the media object descriptions.

16. The device of claim 12, wherein the module configured to control the processor to generate media object hierarchy descriptions further generates temporal object hierarchy descriptions of the media object descriptions based on temporal features relationships of media objects represented by the media object descriptions.

17. The device of claim 12, wherein the module configured to control the processor to generate media object hierarchy descriptions further generates media object hierarchy descriptions of the media object descriptions based on relationships of media objects represented by the media object descriptions, and wherein the relationships are selected from the group comprising media feature relationships, semantic feature relationships, temporal feature relationships and spatial feature relationships.

18. The device of claim 1, wherein the module configured to control the processor to generate multimedia object hierarchy descriptions further generates multimedia object hierarchy descriptions of the multimedia object descriptions based on media feature relationships of multimedia objects represented by the multimedia object descriptions.

19. The device of claim 1, wherein the module configured to control the processor to generate multimedia object hierarchy descriptions further generates semantic object hierarchy descriptions of the multimedia object descriptions based on semantic feature relationships of multimedia objects represented by the multimedia object descriptions.

20. The device of claim 1, wherein the module configured to control the processor to generate multimedia object hierarchy descriptions further generates temporal object hierarchy descriptions of the multimedia object descriptions based on temporal feature relationships of multimedia objects represented by the multimedia object descriptions.

21. The device of claim 1, wherein the module configured to control the processor to generate multimedia object hierarchy descriptions further generates multimedia object hierarchy descriptions of the multimedia object descriptions based on relationships of multimedia objects represented by the multimedia object descriptions, wherein the relationships are selected from the group comprising media feature relationships, semantic feature relationships, temporal feature relationships and spatial feature relationships.

22. The device of claim 1, wherein the module configured to control the processor to generate entity relation graph descriptions further generates the non-hierarchical entity relation graph descriptions of the multimedia object descriptions based on relationships of multimedia objects represented by the multimedia object descriptions, wherein the relationships are spatial feature relationships.

23. The device of claim 1, further comprising the module configured to control the processor to receive and encode the multimedia object descriptions into encoded description information, and store the encoded description information as the at least one description record.

24. The device of claim 1, further comprising the module configured to control the processor to combine the multimedia object description, the multimedia object hierarchy descriptions, and the entity relation graph description to form a multimedia description, and receive and encode the multimedia description into encoded description information, and store the encoded description information as the at least one description record.

* * * * *